Dec. 3, 1929.          F. A. SHORT          1,737,980
EYEGLASS CONSTRUCTION
Filed Jan. 10, 1927
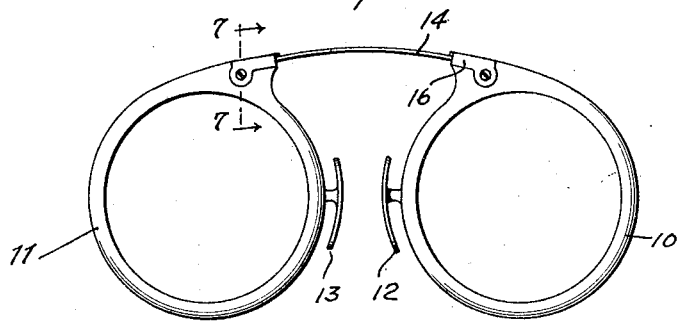
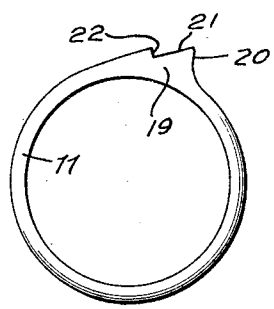
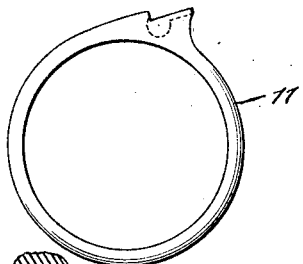
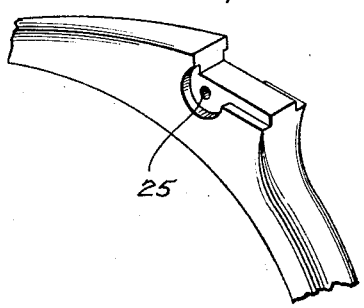
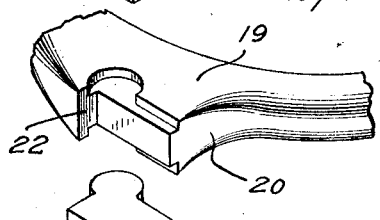
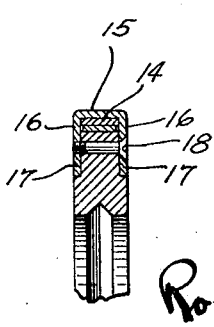
INVENTOR
Frank A. Short
BY
Robert S. Blair ATTORNEY Patented Dec. 3, 1929

1,737,980

UNITED STATES PATENT OFFICE

FRANK A. SHORT, OF HILLSIDE, NEW JERSEY

EYEGLASS CONSTRUCTION

Application filed January 10, 1927. Serial No. 160,047.

This invention relates to eyeglass construction and more particularly to the construction of eyeglass frames which include parts made of non-metallic material.

One of the objects of the invention is to provide an eyeglass frame in which metallic parts are joined to non-metallic parts in a highly efficient manner. Another object is to provide an eyeglass frame embodying metallic parts and non-metallic parts and in which the component parts are joined in such manner that the possibility of loosening and breakage is reduced to a minimum. Another object is to provide a construction of the above nature of pleasing appearance. Another object is to provide a practical art of making eyeglass frames of the above nature which may be carried on conveniently and at low cost. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing, in which is shown one of the various possible embodiments of the mechanical features of this invention, Figure 1 illustrates a completed eyeglass frame;

Figure 2 shows an eyeglass rim member of non-metallic material;

Figure 3 is a view from the right of Figure 2;

Figure 4 shows the eyeglass rim member at a later stage in the manufacture of the eyeglass frame;

Figure 5 illustrates an operation upon the non-metallic rim member;

Figure 6 shows a portion of the rim member after the operation thereon which is illustrated in Figure 5, and Figure 7 is a sectional view taken substantially along the line 7—7 of Figure 1.

Similar reference characters refer to similar parts throughout the several views of the drawing.

Referring now to the drawing in detail, there is shown an eyeglass frame comprising a pair of rims 10 and 11 provided with suitable nose guards 12 and 13 and connected by a nose bridge member 14. The member 14, in this instance, takes the form of a flat metal spring member which, in addition to connecting the two eyeglass rims, serves to urge the two rims toward each other and to thus urge the nose pieces 12 and 13 against the sides of the nose of the wearer. The nose pieces 12 and 13 may take any of the various forms and the form shown in Figure 1 will be understood to be simply illustrative of a possible construction. Also, the nose bridge member 14 may take various forms.

The metal member 14 is joined to the non-metallic rim members 10 and 11 by means which will be described in detail presently, and this invention deals particularly with a method or means of attaching a metal member, such as the member 14, to an eyeglass frame member of nonmetallic material, such as the rim members 10 and 11. The non-metallic material of the rim members 10 and 11 is celluloid or material having similar characteristics and ordinarily employed in the construction of eyeglass frame parts. The term "celluloid" as employed herein, is to be interpreted broadly to signify non-metallic materials employed in the construction of eyeglass frames and having characteristics on the order of or similar to those of celluloid. Such material is frequently referred to as "zylonite."

The means securing the two ends of the member 14 to the rim member 10 and 11 are substantially identical so that one only need be described in detail. As shown in Figure 1 and in Figure 7, the end of the metal member 14 enters a box-like metal member 15 which forms the connection with the non-metallic material of the rim member. This metal member 15 is preferably similar to that described in the co-pending application of Wilbur H. Siddall, Serial No. 149,061, filed November 18, 1926, and need not be described in detail herein. It will be noted that this metal member 15 has depending side walls 16 which embrace a portion of the non-metallic material, and that these side walls are extended downwardly at one end forming depending ears 17. Through these ears 17 and through the non-metallic material therebetween is passed a screw 18.

Considering now more particularly the celluloid rim members, in Figure 2 is shown the rim member 11 as it is first formed. A portion 19 of the rim member is thickened in a radial direction beyond the thickness of the remaining portion of the rim. This thickened portion 19 is preferably formed by a gradual increase in thickness at one end, and at the other end it preferably terminates in an abrupt shoulder 20. The outer surface of the thickened portion 19 is undercut or recessed at 21 for a distance back from the edge of the shoulder 20, forming a shoulder 22. In this recessed portion 21 the box-like metal member 15 is adapted to fit, resting against the shoulder 22 at one end and its other end coming substantially flush with the edge of the shoulder 20. On either side of the thickened portion 19 of the non-metallic material, the metal sides 16 and the ears 17 are adapted to embrace the rim member substantially as indicated by the dotted line in Figure 4. It is desirable that these parts 16 and 17 be set into the celluloid so that their outer surfaces are substantially flush with the celluloid surface and it is also desirable that these parts tightly grip the celluloid in order to afford a firm and rigid connection.

After formation of the rim member 11 as shown in Figures 2, 3 and 4, the rim member is subjected to the operation which is illustrated in Figure 5. There are provided a pair of dies 23 and 24 whose operative surfaces are shaped to outline a contour corresponding to the shape of the walls 16 and ears 17 of the metal member 15. These dies are brought into proper engagement with the opposite sides of the celluloid part 19 and forced together under pressure, compressing the celluloid therebetween and thereby forming in the surfaces of the celluloid recesses or depressions adapted to receive the parts 16 and 17. The compression is carried to such an extent that the recesses formed are of a depth substantially equal to the thickness of the metal of the parts to be inserted therein. The eyeglass rim after the operation of Figure 5 thereon is shown in perspective in Figure 6. After this operation, a hole 25 is drilled for the passage of the screw 18.

It is found that the celluloid or similar non-metallic material is compressible so that it responds to the above treatment and that it remains with substantial permanence in its compressed state. Gradually, it may tend to expand slightly after it has been compressed as above described. The ears 17, when they are placed in position, snugly embrace the compressed celluloid and, moreover, the ears are drawn together by the screw 18. As the compressed celluloid gradually tends to expand in long usage it is gripped more tightly by the depending flanges of ears so that, with the use, the connection between the metal and the celluloid tends to become stronger and more firm instead of loosening as is generally the case. The depending flanges or ears 18 always maintain a secure grip upon the celluloid which is embraced thereby.

From the foregoing it will be seen that there is herein provided a method of joining metallic and non-metallic parts in constructing eyeglass frames which achieves distinct practical advantages. The connection afforded is one which will retain its original firmness indefinitely and, at the same time, the construction has a neat and finished appearance. The method of forming the connection is simple and capable of being carried out conveniently in practical manufacture.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim as my invention:

1. The herein described art of connecting a metal part to a celluloid rim member in making eyeglass frames which consists in compressing a portion of the rim member to form indentations in the celluloid surface on both sides of the rim, inserting portions of the metal member in said indentations, and clamping said portions with said compressed celluloid therebetween.

2. The herein described art of connecting a metal part to a celluloid rim member in making eyeglass frames which consists in compressing a portion of the rim member to form indentations in the celluloid surface on both sides of the rim, associating with the metal member a part having a pair of parallel projecting flanges, registering said flanges in said indentations, and drawing said flanges together against the compressed celluloid therebetween.

3. The herein described art of connecting to a celluloid eyeglass part a metal part having flanges adapted to embrace a portion of the celluloid part which consists in compressing said portion to form indentations on opposite sides thereof to receive said flanges, and registering said flanges in said indentations with said compressed celluloid snugly held therebetween.

4. In eyeglass construction, in combination, an eyeglass rim member of celluloid, and a metal part connected thereto having a pair of spaced ears which embrace a portion of said celluloid, the celluloid between said ears being compressed to form in the surfaces of said rim member recesses in which said spaced ears are tightly contracted.

5. In eyeglass construction, in combination, an eyeglass rim member of celluloid, a metal part connected thereto having a pair of spaced ears which embrace a portion of said celluloid, the celluloid between said ears being compressed to form in the surface of said rim member recesses in which said ears rest, and means passing through said compressed celluloid for drawing said ears toward each other.

6. In eyeglass construction, in combination, an eyeglass frame member of celluloid, and a metal frame member connected thereto having a pair of flanges which embrace a portion of said celluloid member and rest in indentations in the surface thereof, said indentations being formed by compression of the celluloid before said flanges are connected thereto.

7. In eyeglass construction, in combination, an eyeglass frame member of celluloid, a metal frame member connected thereto having a pair of flanges which embrace a portion of said celluloid member and rest in indentations in the surface thereof, said indentations being formed by compression of the celluloid between said flanges, and a screw headed against one of said flanges, passing through said compressed celluloid, and threaded into the other of said ears.

In testimony whereof, I have signed my name to this specification this 5th day of January, 1927.

FRANK A. SHORT.